July 8, 1969   M. K. BIELEC   3,454,312

THRUST BEARING ASSEMBLIES

Filed Sept. 25, 1967   Sheet 1 of 4

INVENTOR
MATEUSZ KAZIMIERZ BIELEC

BY Pierce, Scheffler & Parker
ATTORNEYS

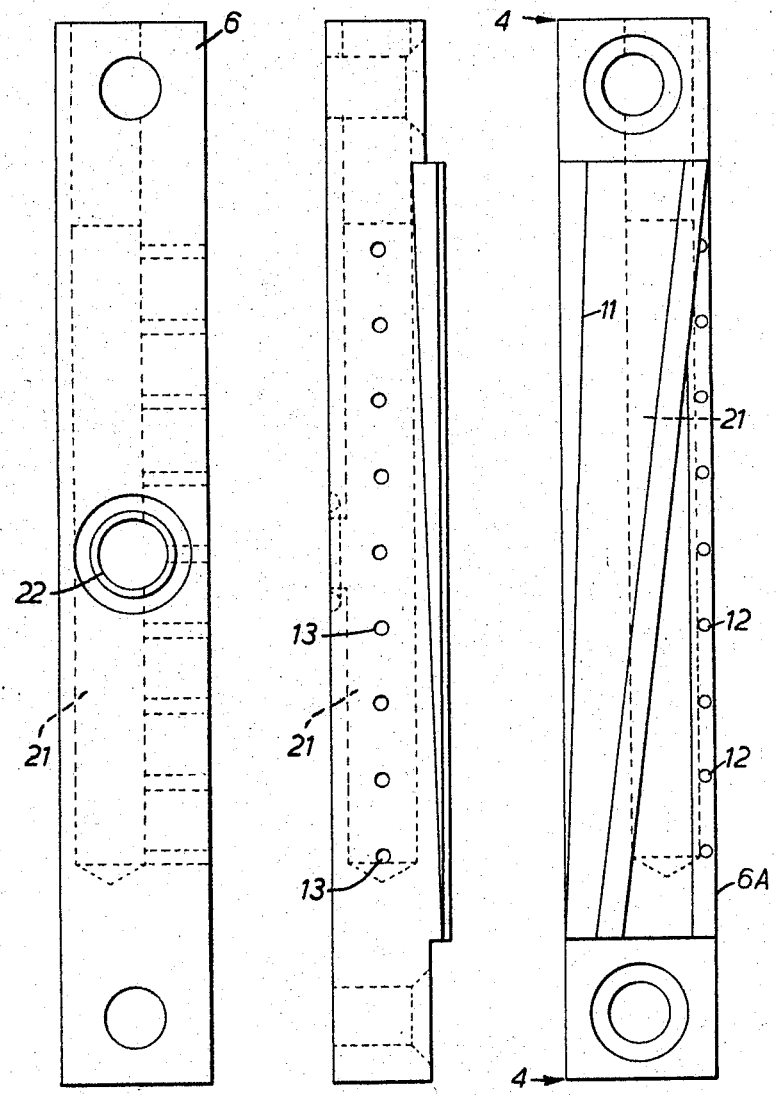

July 8, 1969   M. K. BIELEC   3,454,312
THRUST BEARING ASSEMBLIES
Filed Sept. 25, 1967   Sheet 3 of 4

INVENTOR
MATEUSZ KAZIMIERZ BIELEC
BY
Pierce, Scheffler & Parker
ATTORNEYS

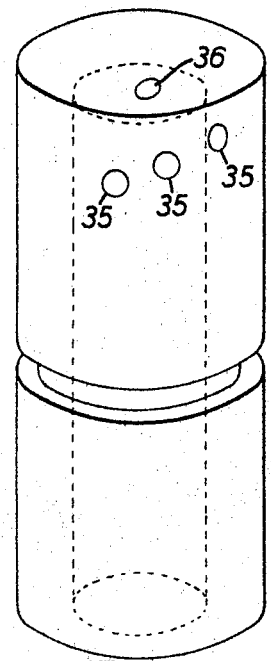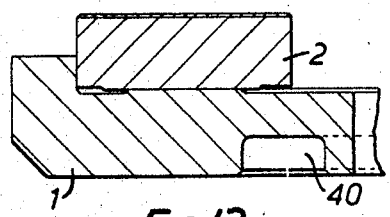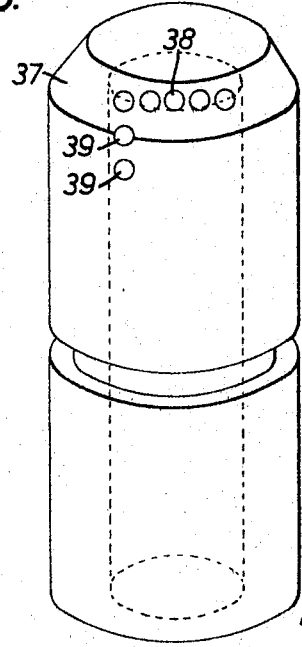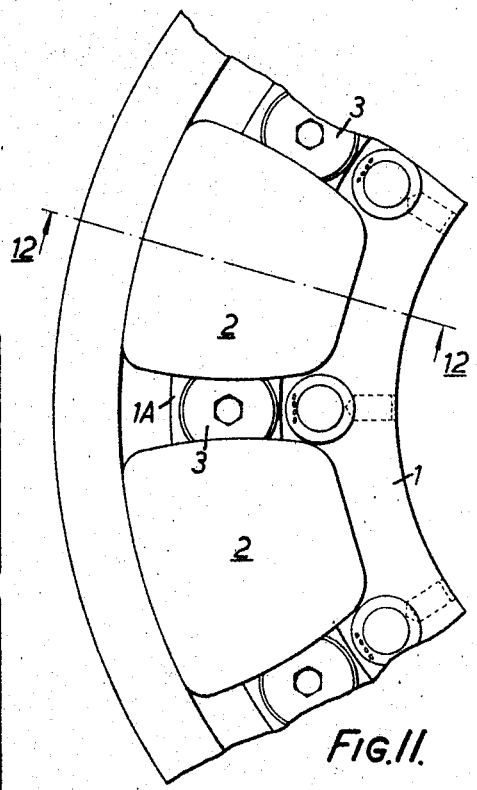

United States Patent Office 3,454,312
Patented July 8, 1969

3,454,312
THRUST BEARING ASSEMBLIES
Mateusz Kazimierz Bielec, London, England, assignor to The Glacier Metal Company Limited, Alperton, Wembley, Middlesex, England
Filed Sept. 25, 1967, Ser. No. 670,351
Claims priority, application Great Britain, Sept. 26, 1966, 42,951/66
Int. Cl. F16c 33/00, 17/06
U.S. Cl. 308—160                                     13 Claims

ABSTRACT OF THE DISCLOSURE

A thrust bearing assembly comprising a support carrying an annular series of separate thrust pads the working surfaces of which constitute the bearing surface against which in use bears a collar and wherein the leading and trailing edges of the working surfaces of adjacent thrust pads are separated circumferentially by spaces while there is supported from the carrier in each of said spaces lubricant distributing means in the form of a distributing member having a chamber to which lubricant is delivered under pressure and ejection passages arranged to direct fluid from the chamber in directions towards the leading edge of the adjacent pad for the purpose of lubricating the working surfaces and towards the collar in such manner as to cause mixing of the lubricant with the lubricant on the collar.

---

Figure 1:
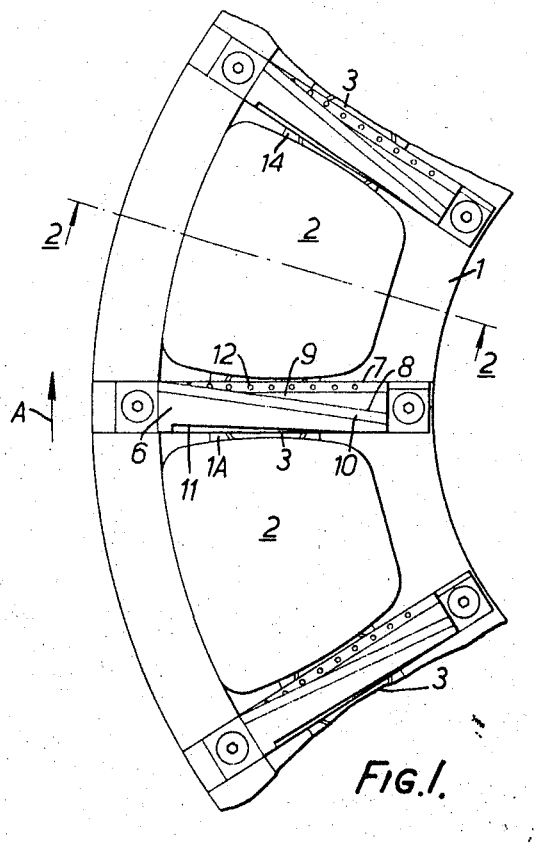

This invention relates to thrust bearing assemblies of the kind comprising a support, for example a carrier ring, carrying an annular series of separate thrust pads the front faces of which (herein called working surfaces) constitute the bearing surface against which in use bears a co-operating annular bearing surface on a rotating member, usually in the form of a collar, and assumed herein to be a thrust collar rigid with a shaft the thrust of which is to be transmitted to the carrier ring. The invention is applicable to such thrust bearing assemblies whether of the type in which thrust pads are mounted on the support in such a way that during operation they can tilt individually relatively to the support, or of the type in which, during operation, the thrust pads cannot tilt relatively to the support.

Such thrust bearings are lubricated with liquid usually oil, although water or other liquids may be used in some cases, and power loss occurs in them due to viscous shear of the lubricating liquid while, in addition, further losses, known as parasitic churning losses, take place and tend to cause heating of the lubricant, in addition to the heating caused by the relative rotation under thrust between the thrust collar and the pads and by reason of the viscous shear and churning losses referred to.

The present invention has for an object to provide an improved thrust bearing assembly of the kind referred to in which the lubricating of the bearing assembly will be provided in a manner which will tend to reduce such power losses, the invention being particularly, but not exclusively, applicable to large thrust bearings rotating at high speeds, say at speeds above 15,000 r.p.m.

A thrust bearing assembly according to the present invention comprises a support or carrier carrying an annular series of separate thrust pads the working surfaces of which constitute the bearing surface against which in use bears a collar and wherein the leading and trailing edges of the working surfaces of adjacent thrust pads are separated circumferentially by spaces while there is supported from the carrier in each of said spaces lubricant distributing means in the form of a distributing member having a chamber to which lubricant is delivered under pressure and ejection passages arranged to direct fluid from the chamber in directions towards the leading edge of the adjacent pad for the purpose of lubricating the working surfaces and towards the collar in such manner as to cause mixing of the lubricant with the lubricant on the collar.

In previous arrangements where lubricant has been injected to lubricate the thrust pads, usually at their leading edges, it has been found that the film of hot lubricant leaving the trailing edge of the pad and adhering to the bearing surface against which the pad bears is difficult to remove, even when scrapers are employed, the film being of the order of 0.001 inch thick, while the speeds of the relatively sliding surfaces are of the order of 100 feet per second. Thus with the present invention the hot film is mixed with cool incoming lubricant and is at least partially removed by the mixing and more effective cooling of the bearing surfaces is achieved than has hitherto been possible.

In one arrangement the ejection passages for supplying lubricating fluid to the working surfaces of adjacent thrust pads are arranged to inject working fluid into areas extending respectively throughout the whole length of the leading edge and trailing edge of the working surfaces of each pad so that the lubricant flows respectively between the leading edge of the working surface of one of the two adjacent pads and the carrier bearing surface along substantially the whole length of the leading edge of that pad and towards the trailing edge of the working surface of the other one of the two adjacent pads in such manner as to tend to mix with the lubricant at that trailing edge. Preferably the lubricant distributing member extends throughout the space between the adjacent edges of each adjacent pair of thrust pads.

One construction of thrust bearing assembly according to the present invention comprises a support or carrier carrying an annular series of separate thrust pads, the working surfaces in which constitute the bearing surface against which in use bears a collar and wherein the thrust pads are circumferentially spaced from one another by stop pins and each stop pin is provided with an internal chamber to which lubricant is delivered under pressure, and ejection passages arranged to direct fluid from the chamber in directions towards the leading edge of the adjacent thrust pad for the purpose of lubricating the working surfaces and towards the collar in such manner as to cause mixing of the lubricant with lubricant on the collar.

Thus in constructions according to the invention the fluid ejection passages delivering fluid towards the trailing edge of the appropriate pad are preferably so directed as to produce turbulence thereby promoting partial removal of the lubricant film on the rotating member as it leaves the pad and the mixing of any remaining film with fresh lubricant while the ejection passages also ensure that an adequate supply of fresh cool lubricant is present at the leading edge of the next pad.

In the case where each stop pin is provided with an internal chamber to which lubricant is delivered under pressure the ejection passages are preferably arranged symmetrically with respect to the axis of the pin, and in a convenient construction the chamber is formed by a bore in the pin extending axially into the pin from the base to a point spaced below the head of the pin. In one construction the ejection passages are arranged to eject fluid from the head of the pin, and in which case they may be so arranged in the head of the pin as to extend in directions having a substantially equal axially and outward radially directed component.

In a further construction of thrust bearing according to the present invention the lubricant distributing means is situated between the adjacent edges of each adjacent pair of thrust pads and comprises a fluid feed device having fluid ejection passages extending approximately radially and arranged to deliver fluid respectively towards the leading and trailing edges of the working surfaces of the adjacent pads.

In any case a part at least of the lubricant is injected towards the collar in such manner as to impinge on the collar in a direction substantially normal to its plane of rotation.

Figure 2:
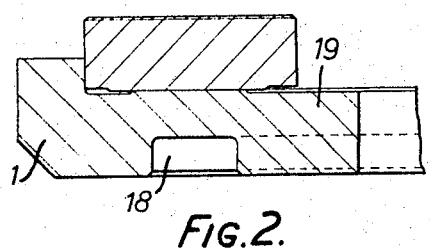
Figure 7:
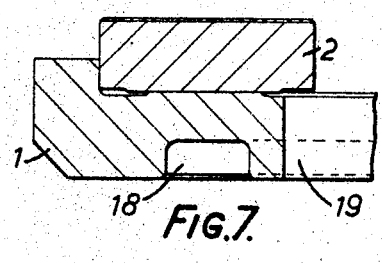
Figure 9:
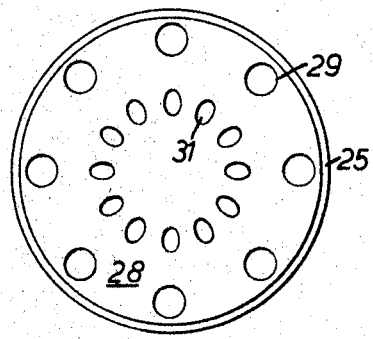
Figure 6:
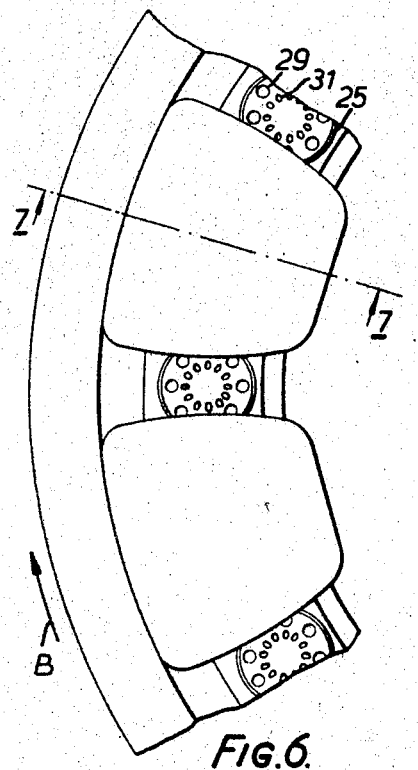
Figure 8:
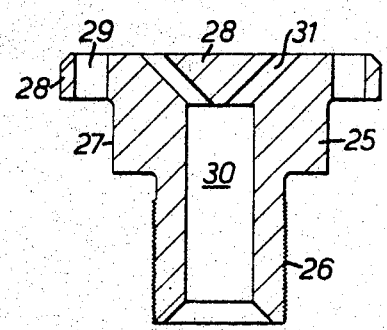
Figure 10:
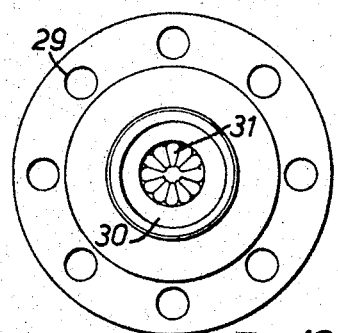

Various constructions according to the invention are shown by way of example in the accompanying drawings, in which:

FIGURE 1 is a front elevation of part of a thrust bearing assembly according to the invention showing the annular support, the series of pads and the lubricant distributing means, FIGURE 2 is a cross section on the line 2—2 of FIGURE 1, FIGURE 3 is a more detailed view of the lubricant distributing means shown in FIGURE 1, FIGURE 4 is a side elevation of the lubricant distributing means shown in FIGURE 3 taken in the direction of the arrow 4 on FIGURE 3, FIGURE 5 is an underneath view of the lubricant distributing means shown in FIGURE 3, FIGURE 6 is a similar view to FIGURE 1 of an alternative construction of thrust bearing assembly according to the invention in which the locating or stop pins are used as the lubricant distributing means, FIGURE 7 is a cross section on the line 7—7 of FIGURE 6, FIGURE 8 is a cross section through one of the locating or stop pins shown in FIGURE 6, FIGURE 9 is a plan view of the pin shown in FIGURE 8, FIGURE 10 is an underneath plan view of the pin shown in FIGURE 8, FIGURE 11 is a similar view to FIGURE 1 of an alternative construction of thrust bearing assembly according to the invention in which the lubricant distributing means are situated adjacent the inner edges of the pads, FIGURE 12 is a cross section on the line 12—12 of FIGURE 11.

FIGURE 13 is a perspective view of one form of lubricant distributing means which may be employed in the arrangement shown in FIGURE 11, and FIGURE 14 is a perspective view of an alternative form of lubricant distributing means which may be employed in the aarrangement shown in FIGURE 11.

In the arrangement shown in FIGURES 1 to 5 the thrust bearing assembly comprises an annular supporting plate or carrier 1 which may be of conventional form and is secured in a manner known per se to a fixed member to which the thrust is to be transmitted, the annular carrier 1 having a rim 1A and having secured to one face thereof a series of thrust pads 2 which are spaced from one another circumferentially.

Each of the pads 2 is secured to the carrier 1 by pins 3 which lie in the spaces between the two adjacent pads and each of which comprises a stem which passes through and is secured in the carrier 1 and a head which is spaced somewhat from the adjacent face 1A of the carrier 1 and projects into slots formed in the adjacent sides of the two adjacent pads, all in a manner generally similar to that employed in thrust bearings of the kind forming the subject of the present applicant's British patent specification No. 1,004,733.

It will be appreciated that the thrust bearing assembly shown in FIGURES 1 and 2 will be used in combination with a rotating member (not shown) in the form of a thrust collar, rigid with a shaft which is co-axial with the assembly, the working face of the thrust collar bearing during operation upon the working surfaces of the pads 2 in a manner known per se and usual in such thrust bearings.

Disposed in each of the spaces between the two adjacent thrust pads and secured to the carrier 1 is a combined lubricating fluid feed and wiper device which is shown more clearly in FIGURES 3 to 5 and comprising a member 6 which extends over the head of the adjacent stop pin 3 and has a leading edge portion 7 and an oblique step 8 which, with the leading edge portion 7, forms an outwardly radially extending channel 9 of decreasing width from its inner to its outer end. The step 8 terminates at a scraper edge formed by the leading edge of a wiper surface 10, which may be formed of white metal and during operation is intended to bear on the adjacent face of the thrust collar and therefore lies approximately in the same plane as the working surfaces of the pads 2.

Extending radially along the trailing edge of the wiper surface 10 is an edge 11 inclined at approximately 45° to side 6A of the member 6 and arranged in which are a series of slots 12 through which lubricant can be delivered to the leading edge of the thrust pad, the direction of rotation of the rotating member being shown by the arrow A in FIGURE 1 from which it will be seen which is the appropriate leading edge.

A further series of apertures 13 as shown in FIGURE 4 are directed towards the trailing edge of the other adjacent pad so that the hot film on the part of the rotating assembly is diluted by turbulent mixing with the supply of lubricating fluid from the apertures 13, the trailing edge of the pad 2 also being cooled by the lubricating fluid from the apertures 13. The lubricant is subsequently partially removed by the scraper 10 before that part of the rotating member reaches the slots 12 directing fluid towards the leading edge of the next pad.

The lubricant from the slots 12 may also further dilute and cool the hot oil film as well as providing lubrication at the leading edge of the pad. It will be seen from FIGURE 3 that the slots 12 are directed towards the rotating member while the slots 13 are generally directed towards the side of the adjacent pad.

As will be seen in FIGURE 2 the carrier 1 is provided with an annular lubricant supply passage 18 through which lubricant is fed under pressure from a lubricant supply source (not shown) by feeder passages 19. The member 6 is provided with a radially extending passage or chamber 21 from which lubricant is supplied to the passages 12 and 13 and which communicates with the passage 18 through a passage 22 in its lower edge which is arranged to communicate with a passage (not shown) in the stop pin 3 extending into the passage 18.

In the alternative arrangement shown in FIGURE 3 the form of the carrier may be regarded as the same as that shown in FIGURE 1 while the form of thrust pads would be similar to the thrust pads shown in FIGURE 1 but the lubricant feed and scraper device and its associated parts are replaced by stop pins 25. Each of the stop pins 25, shown in more detail in FIGURES 9, 10 and 11, is provided with an externally screw-threaded portion 26 at its lower end which is arranged to be secured in a screw-threaded opening (not shown) in the carrier ring 1 while its upper part is formed with an enlarged portion 27 providing a spacer between the carrier ring 1 and a head 28 which projects into slots in the adjacent sides of the two pads. The head is provided with a number of openings 29 and by means of which the stop pin can be screwed into position with an appropriate tool. The pin 25 is provided with a passage or chamber 30, which communicates at its lower end with the passage 18 in the carrier 1 and at its upper end with ejection passages 31 in the head 28, the passages 31 extending upwardly and outwardly at approximately 45° to the top of the head.

As will be seen from FIGURE 9 the passages 31 are symmetrically arranged so that when the stop pins are screwed into position in the carrier it is not necessary to ensure that the nozzles are in any particular position relative to the pads as they can be inserted into any position without affecting the spray pattern.

In operation the carrier will be rotating in the direction indicated by the arrow B in FIGURE 6 and the passages 31 in one half of the stop pin (the lower half as seen in the arrangement shown in FIGURE 6) will be directed against the direction of rotation of the rotating assembly while the passages on the other (upper) half of the stop pin will be directed towards the rotating assembly with a component of motion in the direction of the arrow B. Thus the (lower) group of passages will cause jets of lubricant to impinge on the hot film of the assembly and creating turbulence and mixing which displaces part of the hot fluid film and the displaced fluid is then further cooled by the mixing of it with cool incoming lubricant. The other (upper) passages 31 provide the lubricant for lubricating the pads with respect to the rotating collar. Mixing still carries on at this stage and any surplus lubricant is removed by entry of the rotating assembly under the pad.

The nozzles are preferably arranged in such a way that the lubricant forms a jet, the velocity of which is greatly reduced by its impact against the rotating assembly and is re-accelerated back into contact with the rotating assembly by the fluid from the adjacent openings increasing the turbulence. Adjacent edges of the pads serve as jet deflectors for some of the jets from the upper hand and lower group of openings so that the edges of the pads are cooled by incoming relatively cool fluid before this fluid eventually impinges on the film of the fluid on the rotating assembly.

FIGURE 11 shows a further alternative arrangement in which the pads 2 are held in position by stop pins 3 in conventional manner and as shown in FIGURE 1 while there is arranged between each of the pads lubricant distributing means in the form of pins, two examples of which are shown in FIGURE 13 and FIGURE 14. These are alternative forms of pin each suitable for use in the construction shown in FIGURE 11 according to the application required. The pin shown in FIGURE 13 contains a passage or chamber 34 in it which communicates with openings 35 in its side arranged in the manner shown and a further opening 36 in its upper surface also communicating with the interior of the passage or chamber 34. The arrangement shown in FIGURE 14 is somewhat similar except that where in FIGURE 13 the pin has a flat head the head of the pin shown in FIGURE 14 is provided with a frusto-conical portion 37 in which are horizontally arranged openings 38, while openings 39 are arranged vertically. The passages 34 in the pins are in communication with an annular passage 40 in the carrier 1.

The operation of these arrangements is similar to that described with reference to FIGURES 6 to 10, lubricant being sprayed into the spaces between the pads through the openings so as to mix with the lubricating leading and trailing edge of one pad and to provide lubrication of the leading edge of the other pad. It will be appreciated that the arrangement of the passages in the pins shown in FIGURES 13 and 14 may be varied according to whether more lubricant is required at the leading or trailing edge.

What I claim as my invention and desire to secure by Letters Patent is:

1. A thrust bearing assembly comprising a support carrying an annular series of separate thrust pads the working surfaces of which constitute the bearing surface against which in use bears a collar and wherein the leading and trailing edges of the working surfaces of adjacent thrust pads are separated circumferentially by spaces while there is in each of said spaces lubricant distributing means in the form of a distributing member having a chamber to which lubricant is delivered under pressure and first and second ejection passages arranged to direct fluid from the chamber, respectively, in directions towards the leading edge of one adjacent pad for the purpose of lubricating the working surfaces and in directions towards the collar where it leaves the trailing edge of the other adjacent pad in such manner as to cause mixing of the lubricant with the lubricant on the collar.

2. A thrust bearing assembly as claimed in claim 1 in which the ejection passages for supplying lubricating fluid to the working surfaces of adjacent thrust pads are arranged to inject working fluid into areas extending respectively throughout the whole length of the leading edge and trailing edge of the working surfaces of each pad so that the lubricant flows respectively between the leading edge of the working surface of one of the two adjacent pads and the carrier bearing surface along substantially the whole length of the leading edge of that pad and towards the trailing edge of the working surface of the other one of the two adjacent pads in such manner as to tend to mix with the lubricant at that trailing edge.

3. A thrust bearing assembly as claimed in claim 1 in which the lubricant distributing member extends throughout the space between the adjacent edges of each adjacent pair of thrust pads.

4. A thrust bearing assembly comprising a support carrying an annular series of separate thrust pads the working surfaces of which constitute the bearing surfaces against which in use bears a collar, and wherein the thrust pads are circumferentially spaced from one another by stop pins and each stop pin is provided with an internal chamber to which lubricant is delivered under pressure, and first and second ejection passages arranged to direct fluid from the chamber, respectively, in directions towards the leading edge of one adjacent thrust pad for the purpose of lubricating the working surface and in directions towards the collar where it leaves the trailing edge of the other adjacent thrust pad in such manner as to cause mixing of the lubricant with lubricant on the collar.

5. A thrust bearing assembly as claimed in claim 4 in which the ejection passages are arranged symmetrically with respect to the axis of the pin.

6. A thrust bearing assembly as claimed in claim 4 in which the chamber to which fluid is supplied under pressure is formed by a bore in the pin extending axially into the pin from the base to a point spaced below the head of the pin.

7. A thrust bearing assembly as claimed in claim 4 in which the ejection passages are arranged to eject fluid from the head of the pin.

8. A thrust bearing assembly as claimed in claim 7 in which the fluid ejection passages are so arranged in the head of the pin to extend in directions having a substantially equal axial and outward radial component.

9. A thrust bearing assembly as claimed in claim 1 in which the lubricant distributing means is situated between the adjacent edges of each adjacent pair of thrust pads and comprises a fluid feed device having fluid ejection passages extending approximately radially and arranged to deliver fluid respectively towards the leading and trailing edges of the working surfaces of the adjacent pads.

10. A thrust bearing assembly as claimed in claim 1 in which a part at least of the lubricant is injected towards the collar in such manner as to impinge on the collar in a direction substantially normal to its plane of rotation.

11. A thrust bearing assembly as claimed in claim 1 in which the lubricant distributing means has associated with it wiper means arranged to impede the transfer of lubricating fluid by the annular bearing surfaces from the adjacent trailing edge of one pad to the adjacent leading edge of the other pad.

12. A thrust bearing assembly as claimed in claim 11 in which the wiper means is arranged between the fluid ejection slot or slots or series of apertures delivering fluid towards the leading edge of the one adjacent pad and the ejection slot or slots or series of apertures delivering fluid towards the trailing edge of the other adjacent pad.

13. A thrust bearing assembly as claimed in claim 11 in which the wiper means includes a wiper edge lying approximately in the plane of the working surfaces of the thrust pads.

References Cited

UNITED STATES PATENTS

| 1,836,065 | 12/1931 | Brown | 308—160 |
| 1,900,924 | 3/1933 | Firth | 308—160 |
| 3,378,319 | 4/1968 | Cutting et al. | 308—160 |

MARTIN P. SCHWADRON, *Primary Examiner.*

FRANK SUSKO, *Assistant Examiner.*